United States Patent
Lee et al.

(10) Patent No.: US 11,238,856 B2
(45) Date of Patent: Feb. 1, 2022

(54) IGNORING TRIGGER WORDS IN STREAMED MEDIA CONTENT

(71) Applicant: International Business Machines Corporation, Armonk, NY (US)

(72) Inventors: Eunjin Lee, Eastleigh (GB); Jack Dunning, Lyndhurst (GB); John J. Wood, St. Albans (GB); Giacomo G. Chiarella, Eastleigh (GB); Daniel T. Cunnington, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 15/968,349

(22) Filed: May 1, 2018

(65) Prior Publication Data

US 2019/0341035 A1    Nov. 7, 2019

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/08* (2013.01); *G10L 25/51* (2013.01); *H04L 65/60* (2013.01);
(Continued)

(58) Field of Classification Search
CPC . G10L 2015/221; G10L 15/22; G10L 15/222; G10L 2015/223; G10L 2015/225;
(Continued)

(56) References Cited

U.S. PATENT DOCUMENTS 6,324,499 B1   11/2001  Lewis et al.
7,810,144 B2   10/2010  Haff et al.
(Continued)

FOREIGN PATENT DOCUMENTS

CN    108107403 A    6/2018
CN    109286832 A    1/2019
(Continued)

OTHER PUBLICATIONS

A. H. Michaely, X. Zhang, G. Simko, C. Parada and p. Aleksic, "Keyword spotting for Google assistant using contextual speech recognition," 2017 IEEE Automatic Speech Recognition and Understanding Workshop (ASRU), 2017, pp. 272-278. (Year: 2017).*
(Continued)

*Primary Examiner* — Edgar X Guerra-Erazo
(74) *Attorney, Agent, or Firm* — James L. Olsen

(57) ABSTRACT

Aspects of the present disclosure relate to ignoring trigger words of a buffered media stream. A buffered media stream of media content is accessed in advance of the playing the media stream. One or more trigger words in the media content of the buffered media stream are identified. A time stamp is generated for each of the one or more identified trigger words in relation to a play time of the media content of the buffered media stream. A voice command device is instructed to ignore audio content of the buffered media stream based on the time stamp for each of the one or more identified trigger words while the buffered media stream is played.

19 Claims, 10 Drawing Sheets

(51) Int. Cl.
*H04L 29/06* (2006.01)
*G10L 25/51* (2013.01)
*G10L 15/08* (2006.01)

(52) U.S. Cl.
CPC .. *G10L 2015/088* (2013.01); *G10L 2015/223* (2013.01)

(58) Field of Classification Search
CPC . G10L 2015/228; G10L 15/30; G10L 15/285; G10L 15/32; G10L 15/34; G10L 17/02; G10L 17/22; G10L 17/24; G10L 17/26; G10L 2021/02082; G10L 2021/02087
USPC ........................................................ 704/235
See application file for complete search history.

(56) References Cited

U.S. PATENT DOCUMENTS

| | | | |
|---|---|---|---|
| 9,215,527 B1 | 12/2015 | Saric et al. | |
| 9,304,736 B1 | 4/2016 | Whiteley et al. | |
| 9,384,751 B2 | 7/2016 | Venkatesha et al. | |
| 9,413,868 B2 | 8/2016 | Cronin | |
| 9,431,029 B2 | 8/2016 | Yook et al. | |
| 9,443,010 B1* | 9/2016 | Sundeby | G06F 16/784 |
| 9,548,053 B1 | 1/2017 | Basye et al. | |
| 9,571,490 B2 | 2/2017 | Fu et al. | |
| 9,607,612 B2 | 3/2017 | Deleeuw | |
| 9,633,661 B1 | 4/2017 | Typrin et al. | |
| 9,728,188 B1 | 8/2017 | Rosen et al. | |
| 9,734,845 B1 | 8/2017 | Liu et al. | |
| 9,818,425 B1 | 11/2017 | Ayrapetian et al. | |
| 9,820,036 B1 | 11/2017 | Tritschler et al. | |
| 9,972,339 B1 | 5/2018 | Sundaram | |
| 10,074,364 B1 | 9/2018 | Wightman et al. | |
| 10,079,026 B1 | 9/2018 | Ebenezer | |
| 10,152,966 B1 | 12/2018 | O'Malley et al. | |
| 10,586,534 B1 | 3/2020 | Argyropoulos et al. | |
| 2008/0294439 A1* | 11/2008 | Kirby | G10L 15/26 704/251 |
| 2009/0299752 A1 | 12/2009 | Rodriguez et al. | |
| 2010/0179811 A1* | 7/2010 | Gupta | G10L 15/22 704/235 |
| 2010/0211387 A1 | 8/2010 | Chen | |
| 2011/0191097 A1* | 8/2011 | Spears | G06F 16/9535 704/9 |
| 2012/0114138 A1 | 5/2012 | Hyun | |
| 2014/0122059 A1 | 5/2014 | Patel et al. | |
| 2014/0201639 A1* | 7/2014 | Savolainen | G10L 25/48 715/727 |
| 2014/0207450 A1* | 7/2014 | LaVoie | H04N 21/4542 704/235 |
| 2014/0257812 A1 | 9/2014 | Mozer | |
| 2014/0270219 A1 | 9/2014 | Yu et al. | |
| 2014/0274218 A1 | 9/2014 | Kadiwala et al. | |
| 2014/0278367 A1* | 9/2014 | Markman | G06F 40/253 704/9 |
| 2014/0350935 A1 | 11/2014 | Schuster et al. | |
| 2015/0006176 A1 | 1/2015 | Pogue et al. | |
| 2015/0172814 A1 | 6/2015 | Usher et al. | |
| 2015/0254955 A1* | 9/2015 | Fields | G08B 21/02 705/4 |
| 2015/0279366 A1 | 10/2015 | Krestnikov et al. | |
| 2016/0005394 A1* | 1/2016 | Hiroe | G10L 15/04 704/248 |
| 2016/0027440 A1 | 1/2016 | Gelfenbeyn et al. | |
| 2016/0284350 A1 | 9/2016 | Yun et al. | |
| 2017/0061953 A1 | 3/2017 | An et al. | |
| 2017/0125037 A1 | 5/2017 | Shin | |
| 2017/0169818 A1 | 6/2017 | VanBlon et al. | |
| 2017/0193180 A1 | 7/2017 | Kusens et al. | |
| 2018/0018964 A1 | 1/2018 | Reilly et al. | |
| 2018/0047394 A1 | 2/2018 | Tian et al. | |
| 2018/0068671 A1 | 3/2018 | Fawaz et al. | |
| 2018/0129796 A1* | 5/2018 | Oswal | G06F 21/604 |
| 2018/0268808 A1 | 9/2018 | Song | |
| 2018/0324518 A1* | 11/2018 | Dusan | G10L 25/06 |
| 2018/0332389 A1 | 11/2018 | Ekkizogloy et al. | |
| 2019/0098399 A1 | 3/2019 | Lashkari | |
| 2019/0115018 A1 | 4/2019 | Zurek et al. | |
| 2019/0115019 A1 | 4/2019 | Zurek et al. | |
| 2019/0132694 A1* | 5/2019 | Hanes | H04R 3/00 |
| 2019/0206395 A1 | 7/2019 | Aoki | |
| 2019/0207777 A1* | 7/2019 | Patel | H04L 49/90 |
| 2019/0221210 A1 | 7/2019 | Song | |
| 2019/0250881 A1 | 8/2019 | Lee et al. | |
| 2019/0311719 A1 | 10/2019 | Adams | |
| 2019/0320260 A1 | 10/2019 | Alders et al. | |

FOREIGN PATENT DOCUMENTS

| | | |
|---|---|---|
| CN | 109308908 A | 2/2019 |
| WO | 2017173141 A1 | 10/2017 |

OTHER PUBLICATIONS

Lee et al., "Distinguishing Voice Commands", U.S. Appl. No. 16/545,462, filed Aug. 20, 2019.
IBM, List of IBM Patents or Patent Applications Treated as Related, Aug. 20, 2019, 2 pages.
Lee et al., "Ignoring Trigger Words in Streamed Media Content", Application No. 201910358068.X, Filed Apr. 30, 2019.
Gibbs, M., "Amazon Echo: Wow!", Network World, Sep. 11, 2015, pp. 1-4. https://www.networkworld.com/article/2983632/cloud-computing/amazon-echo-wow.html.
"Change the Wake Word," Amazon.com Help, printed Jan. 15, 2018, 2 pages. https://www.amazon.com/gp/help/customer/display.html?nodeId=201971890&language=en_US.
Nichols, S., "TV anchor says live on-air Alexa, order me a dollhouse—guess what happens next," The Register, Jan. 7, 2017, 5 pages. https://www.theregister.co.uk/2017/01/07/tv_anchor_says_alexa_buy_me_a_dollhouse_and_she_does/.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.
Islam et al., "SoundSifter: Mitigating Overhearing of Continuous Listening Devices," MobiSys '17: Proceedings of the 15th Annual International Conference on Mobile Systems, Applications, and Services, Jun. 2017, pp. 29-41, ACM. DOI: 10.1145/3081333.3081338.
"Dynamic time warping," Wikipedia, printed: Mar. 29, 2018, pp. 1-6. https://en.wikipedia.org/wiki/Dynamic_time_warping.
"Damerau-Levenshtein distance," Wikipedia, printed: Mar. 29, 2018, pp. 1-6. https://en.wikipedia.org/wiki/Damerau%E2%80%93Levenshtein_distance.
"How to detect how similar a speech recording is to another speech recording," stack overflow, Questions, posted:Jun. 2013, printed: Mar. 29, 2018, pp. 1-12. https://stackoverflow.com/questions/17010516/how-to-detect-how-similar-a-speech-recording-is-to-another-speech-recording.
Samarawickrama, L., "Comparing two audio files with Fast Fourier Transformation (FFT)," Lahiru'S TraverSAL—Tech Blog, Feb. 28, 2015, pp. 1-2. https://lstsal.wordpress.com/2015/02/28/comparing-two-audio-files/.
"IPA Phonetic Transcription of English Text | toPhonetics," printed: Mar. 29, 2018, pp. 1-2. http://lingorado.com/ipa/.
Vincent, J., "Inaudible ultrasound commands can be used to secretly control Siri, Alexa, and Google Now," The Verge, Sep. 7, 2017, pp. 1-6. https://www.theverge.com/2017/9/7/16265906/ultrasound-hack-siri-alexa-google.
Lee et al., "Voice Command Filtering," U.S. Appl. No. 15/896,323, filed Feb. 14, 2018.
Dunning et al., Distinguishing Voice Commands, U.S. Appl. No. 15/968,320, filed May 1, 2018.
List of IBM Patents or Patent Applications Treated as Related, Signed May 1, 2018, 2 pages.

(56) References Cited

OTHER PUBLICATIONS

Notification of Transmittal of the International Search Report and the Written Opinion of the International Searching Authority, or the Declaration, Nov. 30, 2020, 9 pages.

* cited by examiner

IGNORING TRIGGER WORDS IN STREAMED MEDIA CONTENT

BACKGROUND

The present disclosure relates to voice command devices, and more specifically, to voice command filtering.

Voice command devices (VCD) are controlled by human voice commands Devices are controlled by human voice commands to remove the need to operate a device using hand controls such as buttons, dials, switches, user interfaces, etc. This enables a user to operate devices whilst their hands are occupied with other tasks or if they are not close enough to the device to touch it.

VCDs may take various form including devices with a dedicated use such as home appliances, controllers for other devices, or be used as personal assistants. VCDs in the form of virtual personal assistants may be integrated with computing devices such as smart phones. Virtual personal assistants may include voice activated instructions for performing tasks or services in response to voice commands and inputs.

VCDs may be activated by a voice command in the form of one or more trigger words. VCDs may use voice recognition to be programmed only to respond to a registered individual's voice or a group of registered individual's voices. This prevents non-registered users from giving commands. Other types of VCD are not tuned to registered users and allow any user to give a command in the form of designated command words and instructions.

SUMMARY

Embodiments of the present disclosure include a method, computer program product, and system for ignoring trigger words of a buffered media stream. A buffered media stream of media content can be accessed in advance of the playing the media stream. One or more trigger words in the media content of the buffered media stream can be identified. A time stamp can be generated for each of the one or more identified trigger words in relation to a play time of the media content of the buffered media stream. A voice command device can be instructed to ignore audio content of the buffered media stream based on the time stamp for each of the one or more identified trigger words while the buffered media stream is played.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
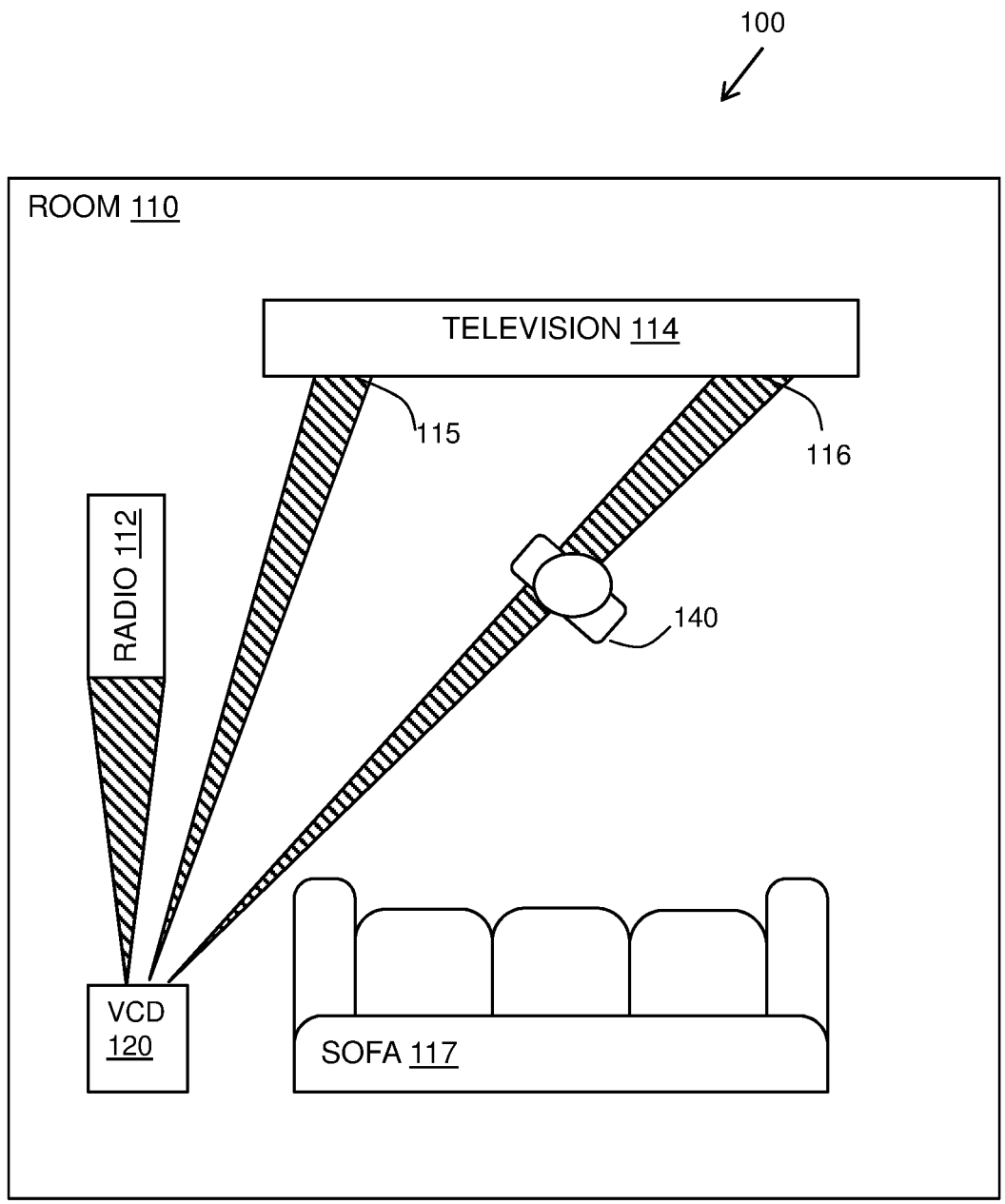
FIG. 1 is a schematic diagram illustrating an environment in which embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field voice command devices, and in particular to voice command filtering. While the present disclosure is not necessarily limited to such applications, various aspects of the disclosure may be appreciated through a discussion of various examples using this context.

Voice command devices (VCD) are controlled by human voice commands Devices are controlled by human voice commands to remove the need to operate a device using hand controls such as buttons, dials, switches, user interfaces, etc. This enables a user to operate devices whilst their hands are occupied with other tasks or if they are not close enough to the device to touch it.

Complications arise when a VCD is triggered by a voice command from a television, radio, computer, or other non-human device that emits a voice in the vicinity of the VCD. For example, a VCD in the form of a smart speaker incorporating a voice-controlled intelligent personal assistant may be provided in a living room. The smart speaker may erroneously respond to audio from a television. Sometimes this may be a benign command that the smart speaker does not understand; however, occasionally the audio is a valid command or trigger word that may result in an action by the intelligent personal assistant.

Aspects of the present disclosure differentiate genuine human commands from commands issued by non-human sources (e.g., a television or radio) by taking advantage of a feature of media streaming devices that can buffer content, so future content can be preempted. Smart media streaming devices, for example, smart television streaming media, can establish a connection with a voice command device, such as a personal assistant device. As a user watches a video or listens to audio, the future content can be buffered. As the content is being watched or listened to, the media streaming device can transmit the times and duration of upcoming trigger words to the voice command device. The voice command device can then ignore a command when the streamed content plays (emits audio including) the trigger word.

Referring to FIG. 1, a schematic diagram 100 depicts a room 110 in which a VCD 120 may be positioned, in accordance with embodiments of the present disclosure. For example, the VCD 120 may be in the form of a smart speaker including a voice-controlled intelligent personal assistant that is located on a table next to a sofa 117 in the room 110.

The room 110 may include a television 114 from which audio may be emitted from two speakers 115, 116. The room 110 may also include a radio 112 with a speaker. The television 114 and radio 112 may both be in the form of smart media streaming devices that stream video and/or audio content to a user in the room 110.

The VCD 120 may receive audio inputs from the two television speakers 115, 116 and the radio 112. These audio inputs may include voices that may include trigger words for commands that mistakenly trigger the VCD 120 or provide input to the VCD 120.

Aspects of the present disclosure provide added functionality to a smart media streaming device such as the television 114 or radio 112 and a VCD 120 to ignore at the VCD 120 audio outputs from the media streaming device of trigger words (or words similar to trigger words) to avoid erroneous command execution at the VCD 120. In embodiments, the VCD 120 can be configured to receive and execute audio input of trigger words for commands from a human user 140 in the vicinity of the television 114 or radio 112.

Figure 2:
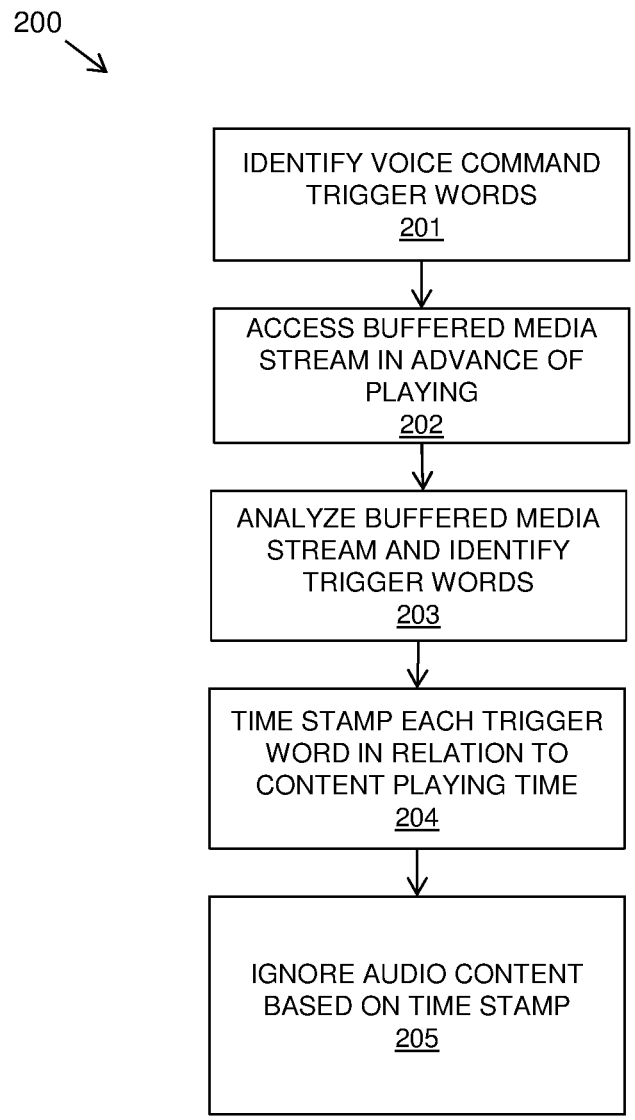
FIG. 2 is a flow diagram illustrating an example method for ignoring trigger words of a buffered media stream, in accordance with embodiments of the present disclosure.

FIG. 2 is a flow diagram illustrating of an example method 200 of preempting (e.g., ignoring) trigger words of a buffered media stream at a VCD, in accordance with embodiments of the present disclosure.

The method 200 initiates where voice command trigger words are identified. This is illustrated at step 201. In embodiments, a data store can include a table of all trigger words and corresponding actions to be executed for each respective trigger word. These can be stored on local memory of the VCD. In some embodiments, trigger words can be dynamically updated. For example, trigger words can be configured by a user or be automatically adjusted based on received audio input. Trigger words (or trigger phrases) are audio signals that, when recognized by the VCD, cause a particular action execution (e.g., a trigger phrase "Power Off" can cause a corresponding action to turn off the VCD).

A buffered media stream is then accessed prior to the media stream being played (e.g., output by the media device). This is illustrated at step 202. In embodiments, the media stream can be accessed over a network. The media stream can be accessed on a pull basis (e.g., as requested by the VCD) or a push basis (e.g., as pushed to the VCD by the media device). The media stream can be buffered for any suitable period prior to being output by the media device. For example, the media stream can be buffered for 5 seconds, 10 seconds, 1 minute, etc. prior to output by the media device. In embodiments, the stream can be can be automatically accessed instantaneously upon buffering.

The buffered media stream is then analyzed to identify trigger words (including words substantially similar to trigger words). This is illustrated at step 203. Analyzing the buffered media stream can be completed in any suitable manner In some embodiments, conventional audio recognition techniques are used to identify trigger words present in the buffered media stream. In some embodiments, trigger words are identified based on a Fast Fourier Transform (FFT) comparison to known trigger words. In some embodiments, a transcript of the buffered media stream is obtained (e.g., using natural language processing (NLP) techniques or subtitles accompanying the media content), and the transcript is analyzed for the trigger words. For example, the transcript can be parsed using a table of known trigger words to identify upcoming trigger words. In embodiments, natural language processing can include morphological segmentation to separate words into morphemes, part of speech (POS) tagging to determine parts of speech (e.g., noun, verb, etc.) for each word, parsing to determine parse trees of a given sentence, sentiment analysis for determining sentiment of words (e.g., subjective information), relationship extraction to determine relationship between entities (e.g., the relationship between an individual and a business can be "employee), phonetic determination for determining sounds of words (e.g., for sound comparison), lexical semantics, etc. In some embodiments, the trigger words can be pre-tagged to the media content from the streaming service.

A time stamp is generated for each identified trigger word (and/or word that resembles a trigger word). This is illustrated at step 203. The generated time stamp corresponds to a time in the media content that the trigger words is recited. Accordingly, if a user pauses during the content, the upcoming time stamp remains valid. The time stamping may also include a duration of the trigger word such that all of the potential triggers may be ignored. For example, the time stamp can encompass a time range in which commands are to be ignored (e.g., 5 seconds).

The audio content is then ignored based on the time stamp. This is illustrated at step 205. In some embodiments, the audio content is only ignored from the direction (e.g., as identified by triangulation or time difference of arrival (TDOA) via two or more microphones mounted in a VCD) of the media streaming device at the time stamped period. In some embodiments, all audio input is ignored (e.g., from every direction) at the VCD at the time stamped period. In some embodiments, only recognized voices are permitted during the time stamped period. Ignoring the audio input and preventing the command from being processed may be carried out either by not processing the command at the VCD or by processing but disregarding the command at the VCD. The ignoring is carried out by the VCD at the instructed time and for the instructed duration.

Figure 3A:
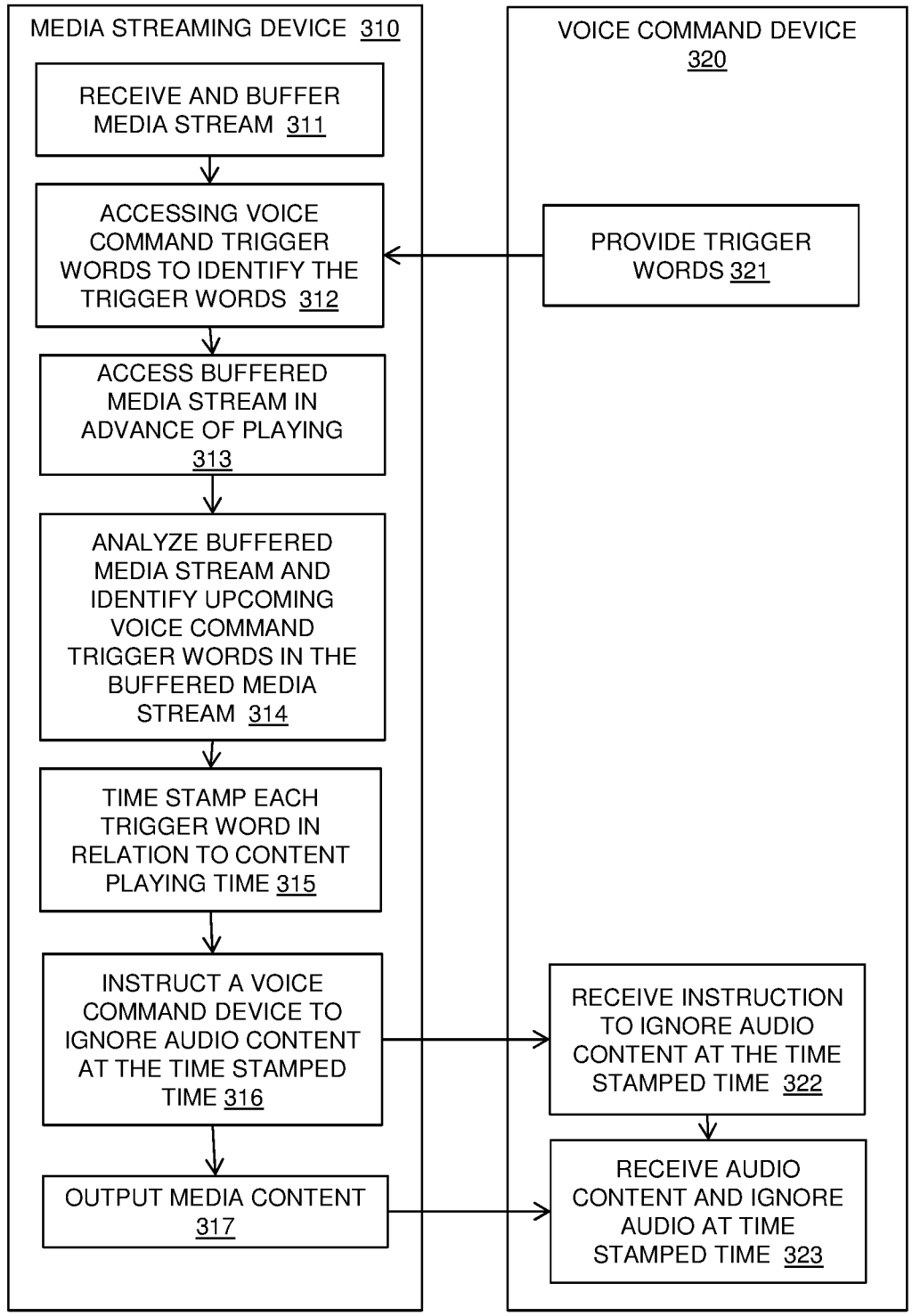
FIG. 3A is a flow diagram illustrating an example method for ignoring trigger words of a buffered media stream as processed by a media streaming device, in accordance with embodiments of the present disclosure.

FIG. 3A is a flow diagram illustrating an example method 300 for ignoring trigger words in a streamed media content as processed by a media streaming device 310, in accordance with embodiments of the present disclosure. The media streaming device 310 can be communicatively coupled to a VCD 320 (e.g., VCD 120). For example, the communication can be established though wired connections (e.g., Ethernet), WiFi, or Bluetooth.

The media streaming device 310 receives and buffers a media stream. This is illustrated at step 311. The media stream can be received over a network from a media content provider. In embodiments, the media stream can include subtitles (e.g., text transcripts) for corresponding audio. The media stream can be buffered (e.g., temporarily stored) for any suitable time period (e.g., 5 seconds, 30 seconds, 1 minute, 10 minutes, 1 hour, etc.). The media stream can be video or audio media. The media streaming device 310 may implement the described functionality by means of a software program or extension provided or accessed at the media streaming device 310.

Voice command trigger words are accessed to identify applicable trigger words. This is illustrated at step 312. In some embodiments, trigger words are stored on the media streaming device 310. In some embodiments, trigger words are transmitted from the voice command device 320 to the media streaming device 310. This is illustrated at step 321.

The buffered media stream is then accessed in advance of outputting the media stream. This is illustrated at step 313. In embodiments, the buffered media stream is accessed a predefined period of time prior to output on the media device. The buffered media stream is then analyzed by the media streaming device 310 to identify upcoming voice command trigger words in the buffered media stream. This is illustrated at step 314. The analysis can be completed based on audio comparisons. For example, audio recognition can be used to compare the streamed media content to the trigger words in order to identify a match. In some embodiments, analysis of the media streamed content to identify trigger word is completed based on a text comparison. For example, a text transcript can be obtained for the streamed media content (e.g., using natural language processing, audio-to-text conversion, or by obtaining subtitles for the streamed media content) and be compared to characters of the trigger words to identify a match.

A time stamp is generated for each identified trigger word (and/or word that resembles a trigger word). This is illustrated at step 315. In embodiments, the time stamp is generated based on the play time of the media content. The time stamp can cover the duration of the trigger word (e.g., if a trigger word is recited for 0.5 second, the time stamp can correspond to the 0.5 seconds the trigger word is recited). In some embodiments, the time stamp duration encompasses a predetermined time interval in which the trigger word was recited (e.g., commands are ignored 3 seconds before and after an identified trigger word is recited).

The media streaming device 310 then instructs the voice command device 320 to ignore audio content based on the time stamp. This is illustrated at step 316. The voice command device receives the instruction and ignores the audio content based on the time stamp. This is illustrated at step 322. In embodiments, ignoring can be completed based on a direction of the media streaming device 310. In embodiments, ignoring can be completed for any direction based on the time stamp. In some embodiments, only recognized voices are permitted, and any other audio input at the VCD 320 is ignored.

The media content is then output (played) to the voice command device 320 by the media streaming device 310. This is illustrated at step 317. The media content output can include the playtime of the media content such that trigger words can be ignored based on the timestamps in relation to the playtime. The VCD 320 receives the audio content and ignores audio at the time stamped time. This is illustrated at step 323. In this way, any trigger words or any words confusingly similar to the trigger words output by the media streaming device are ignored by the VCD 320 and do not result in erroneous command of the VCD 320.

Figure 3B:
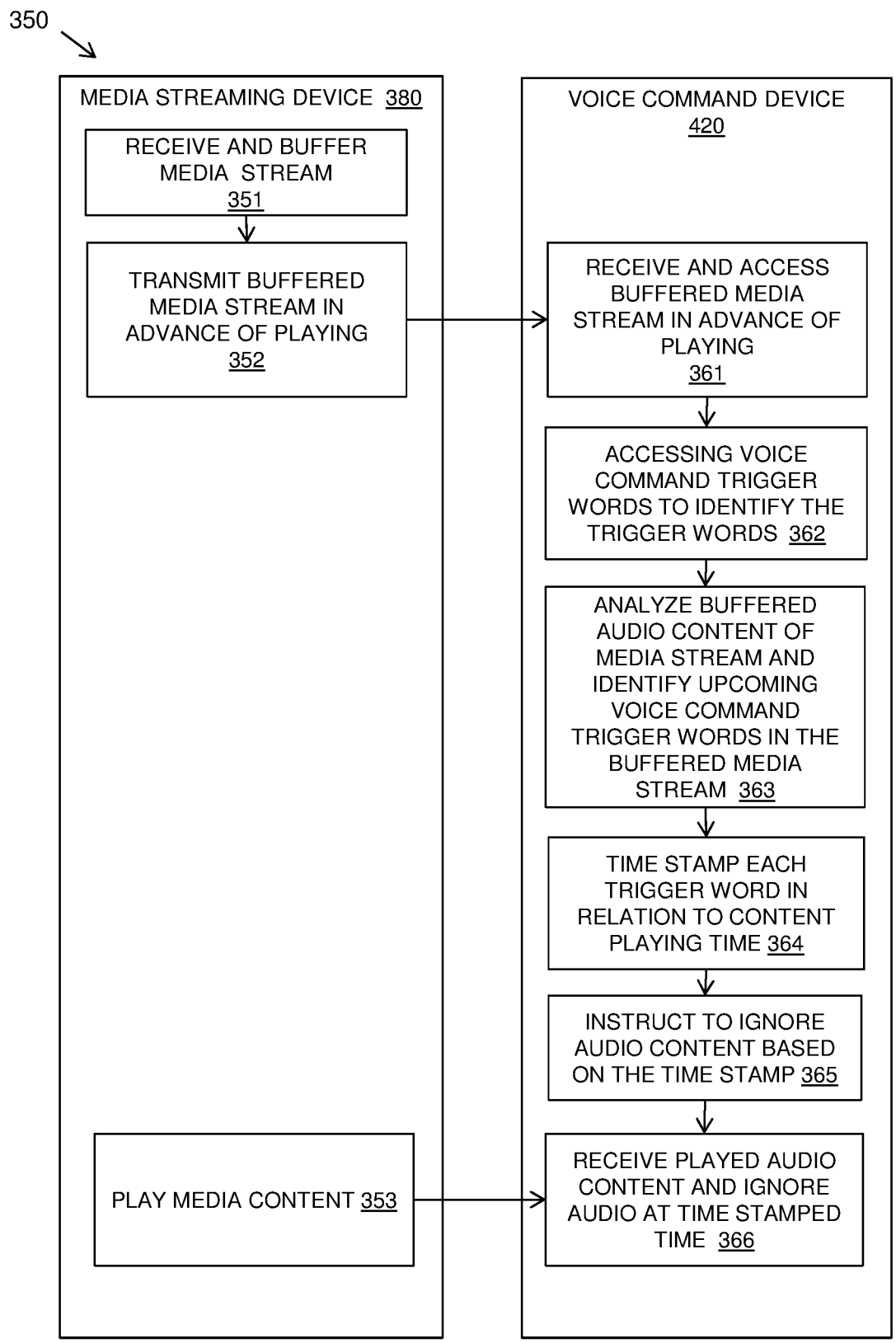
FIG. 3B is a flow diagram illustrating an example method for ignoring trigger words of a buffered media stream as processed by a voice command device, in accordance with embodiments of the present disclosure.

Referring now to FIG. 3B, shown is a flow diagram for ignoring trigger words of a streamed media content as processed by a voice command device 420, in accordance with embodiments of the present disclosure. A media streaming device 380 can be communicatively coupled to the voice command device 420 in any suitable manner (e.g., a local area network (LAN), WiFi, Bluetooth, etc.). The media streaming device 380 and voice command device 420 can be the same as, or substantially similar to, the media streaming device 310 and voice command device 320 of FIG. 3A, respectively.

The media streaming device 380 receives and buffers a media stream. This is illustrated at step 351. The media stream can be received over a network from a media content provider. In embodiments, the media stream can include subtitles (e.g., text transcripts) for corresponding audio. The media stream can be buffered (e.g., temporarily stored) for any suitable time period (e.g., 5 seconds, 30 seconds, 1 minute, 10 minutes, 1 hour, etc.). The media stream can be video or audio media. The media streaming device 380 may implement the described functionality by means of a software program or extension provided or accessed at the media streaming device 380.

The buffered media stream is then transmitted to the voice command device 420 by the media streaming device 380. This is illustrated at step 352. The voice command device 420 then receives and accesses the buffered media stream in advance of playing. This is illustrated at step 361. In embodiments, the buffered media stream is accessed a predefined period of time prior to output on the media device.

The buffered media stream is then analyzed by the voice command device 420 to identify upcoming voice command trigger words in the buffered media stream. This is illustrated at step 363. The analysis can be completed based on audio comparisons. For example, audio recognition can be used to compare the streamed media content to the trigger words in order to identify a match. In some embodiments, analysis of the media streamed content to identify trigger word is completed based on a text comparison. For example, a text transcript can be obtained for the streamed media content (e.g., using natural language processing, audio-to-text conversion, or by obtaining subtitles for the streamed media content) and be compared to characters of the trigger words to identify a match.

A time stamp is generated for each identified trigger word (or word that resembles a trigger word). This is illustrated at step 364. In embodiments, the time stamp is generated based on the play time of the media content. The time stamp can cover the duration of the trigger word (e.g., if a trigger phrase is recited for 5 seconds, the time stamp can correspond to the 5 seconds the trigger word is recited).

The VCD 420 is then instructed (e.g., by the VCD 420 itself) to ignore audio content based on the time stamp. This is illustrated at step 365. In embodiments, ignoring can be completed based on a direction of the media streaming device 380 (e.g., as identified by triangulation or TDOA). In embodiments, ignoring can be completed for any direction based on the time stamp. In some embodiments, only recognized voices are permitted, and any other audio input at the VCD 420 is ignored. In some embodiments, in which one or more blocked directions are stored, only audio originating from the one or more blocked directions is ignored.

The media content is then output (e.g., played) to the voice command device 420 by the media streaming device 380. This is illustrated at step 353. The media content output can include the playtime of the media content such that trigger words can be ignored based on the timestamps in relation to the playtime. The VCD 420 receives the streamed media content and ignores audio at the time stamped time. This is illustrated at step 366. In this way, any trigger words (or any words confusingly similar to the trigger words)

output by the media streaming device are ignored by the VCD 320 and do not result in erroneous command of the VCD 320.

Figure 4:
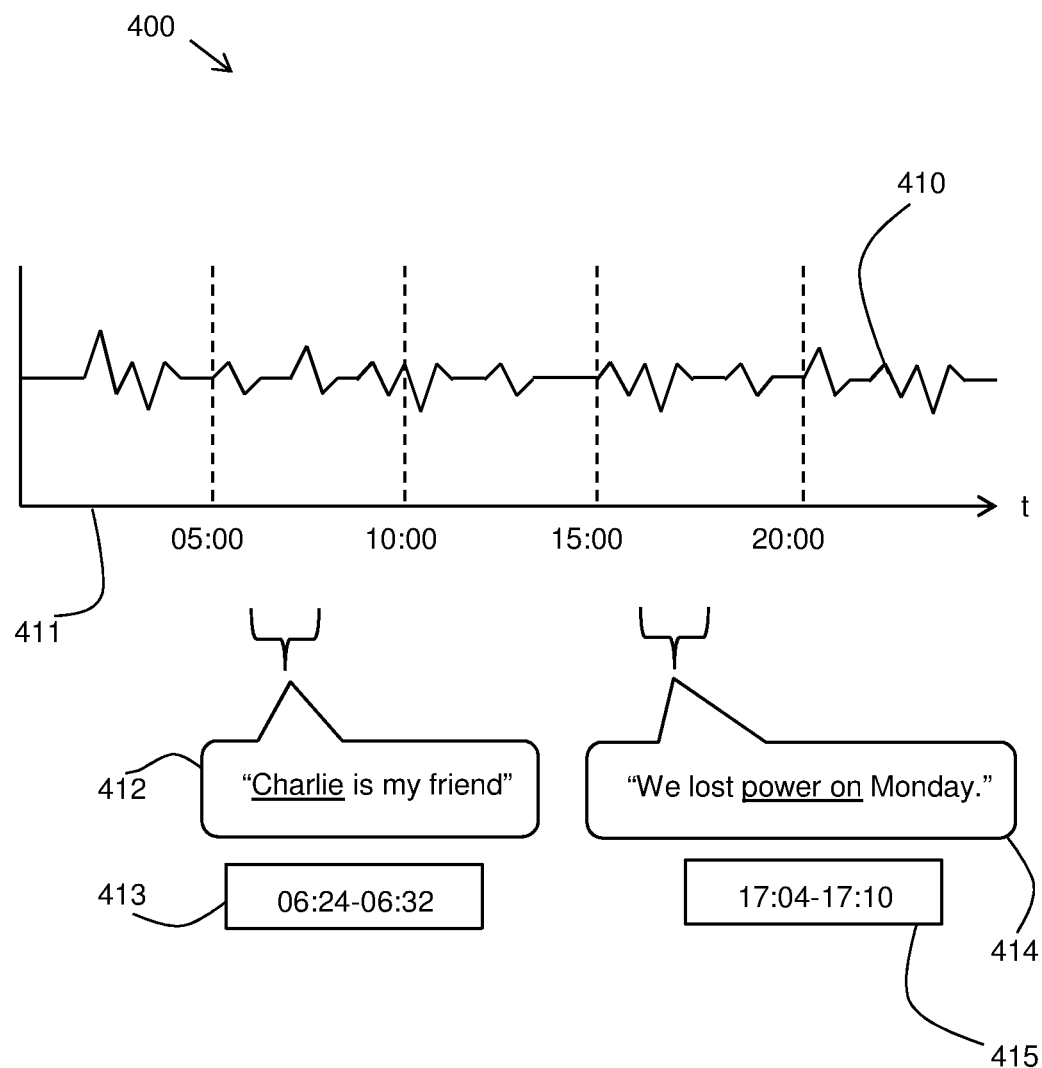
FIG. 4 is a schematic illustrating time stamps of trigger words in a buffered media stream, in accordance with embodiments of the present disclosure.

FIG. 4 is a schematic illustrating time stamps of trigger words in a buffered streamed media content, in accordance with embodiments of the present disclosure.

Audio content 410 of a buffered media stream is depicted against a time axis 411. The audio content 410 is analyzed to identify portions of the audio that include trigger words or words that are confusingly similar to the trigger words. This can be completed using any of the methods described with reference to FIGS. 1-3 (e.g., text comparisons, audio recognition, FFT, etc.)

In some embodiments, the streaming service may pre-tag the words to be ignored and may provide metadata relating to the media stream identifying the time stamps in the media stream of trigger words.

The pre-tagging may be provided in the form of metadata alongside the streamed content. There may be a mark that says "potential voice command", and the trigger word that might be interpreted at that time stamp. The content may be pre-tagged by the media company, with known definitions of a trigger word or specific set of VCDs. For example, if known trigger words are "Charlie" (e.g., based on a user's name) and "Power On", these trigger words can be pre-tagged by the media content provider.

In another embodiment, audio to text conversion may be used to identify trigger words. The analysis may use a speech to text conversion to obtain a transcript of words in the audio content 410.

The analysis may be carried out by any one of multiple known audio comparison methods. The audio comparison method may use dynamic time warping in which the speed of spoken words is aligned in audio files for better comparison. Another option is to use a Fast Fourier Transformation (FFT) for comparison.

Another option is to use a phonetic representation of text to compare a string similarity. A speech to text component may obtain a transcript of words in the buffered content. This transcript may then be converted to a phonetic representation. The phonetic representation may then be compared to a phonetic representation of the trigger words. Slight differences in the words may be accounted for, using known string similarity and text comparison methods.

In the example audio content 410, there are two phrases that are identified as trigger words. A first phrase 412 "Charlie is my friend" occurs at the timestamp 413 of 06:24 to 06:32. A second phrase 414 "We lost power on Monday" occurs at the timestamp 415 of 17:04 to 17:10. The trigger words are underlined.

Therefore, an instruction may be provided and processed at a VCD (e.g., VCD 120, 320, 420) to ignore commands received at the timestamps 413, 415 of 06:24 to 06:32 and 17:04 to 17:10.

Though this example depicts words in the audio content 410 that match trigger words, in embodiments, similar words can also be time stamped. Using this example, "Charles," "Charcoal," "Karlie," etc. can be words confusingly similar to "Charlie." In some embodiments, words that are similar to trigger words can be validated by inputting them into a VCD to determine whether a corresponding response is executed. As referenced herein, "trigger words" refers not only to explicitly defined trigger words, but also to words that resemble or are substantially similar to trigger words.

Figure 5A:
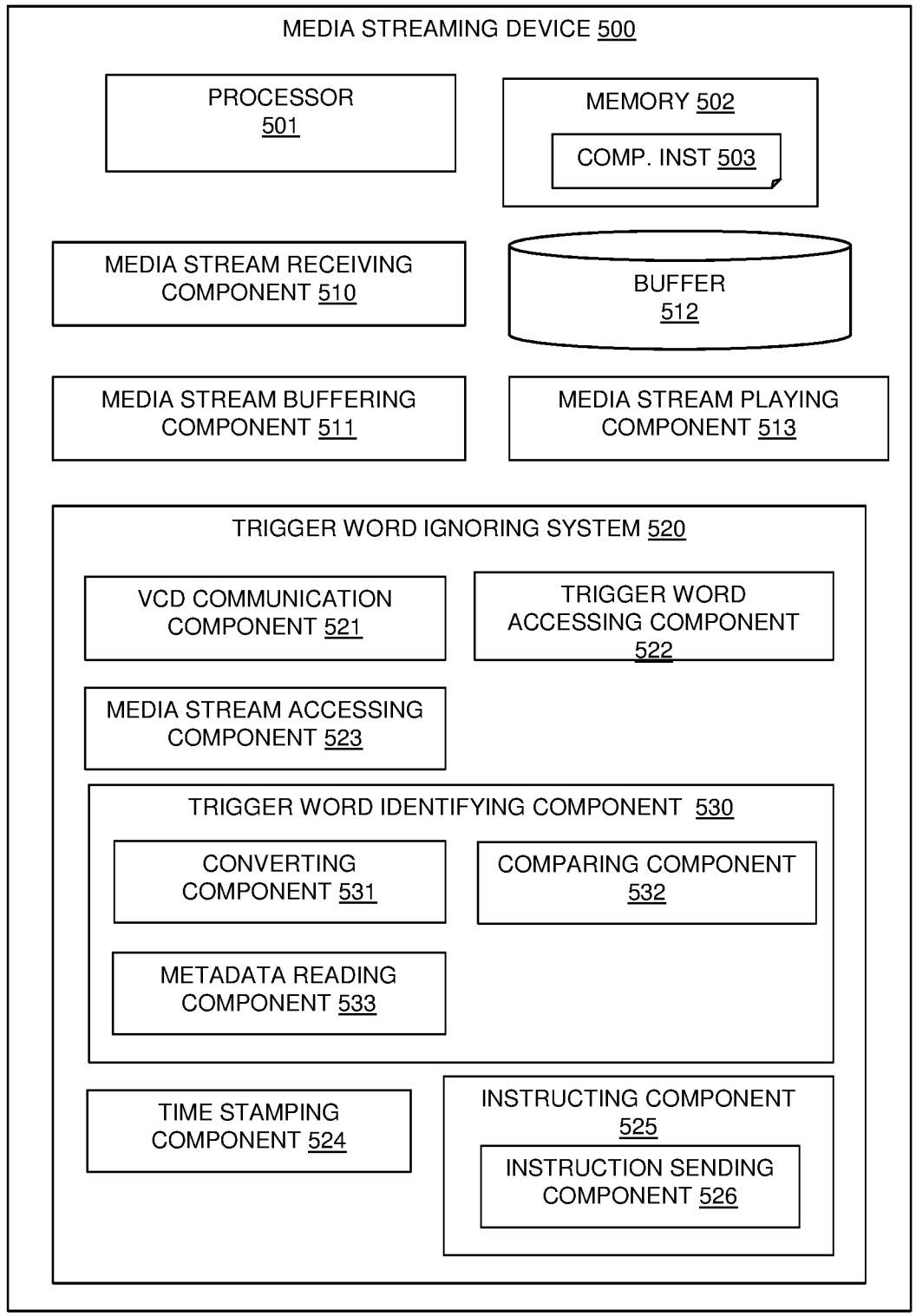
FIG. 5A is a block diagram of a media streaming device, in accordance with embodiments of the present disclosure.

FIG. 5A is a block diagram illustrating a media streaming device 500, in accordance with embodiments of the present disclosure. The media streaming device 500 can be the same as, or substantially similar to, the media streaming device 310 of FIG. 3A or 380 of FIG. 3B.

The media streaming device 500 may have at least one processor 501, a hardware module, or a circuit configured to execute the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The media streaming device 500 may include a media stream receiving component 510 and a media stream buffering component 511 configured to receive and buffer the media stream in a buffer 512 prior to outputting the media stream by a media stream playing component 513.

The media streaming device 500 includes a trigger word ignoring system 520 which includes a VCD (e.g., VCD 120, 320, 420) communication component 521 configured to communicate with a VCD in a near vicinity, for example via a WiFi or Bluetooth communication.

The trigger word ignoring system 520 at the media streaming device 310 may include a trigger word accessing component 522 configured to access details of voice command trigger words as supplied by a VCD via the VCD communication component 521.

The trigger word ignoring system 520 may also include a media stream accessing component 523 configured to access a buffered media stream in advance of playing the media stream and a trigger word identifying component 530 configured to identify upcoming voice command trigger words (or confusingly similar words to command trigger words) in the buffered media stream.

In embodiments, the trigger word identifying component 530 may include a converting component 531 configured to convert an audio content of the buffered media stream from audio to text and a comparing component 532 configured to compare the text with text of known trigger words.

In some embodiments, the trigger word identifying component 530 may include a metadata reading component 533 configured to read metadata received with the buffered media stream for identifying voice command trigger words in an audio content of the media stream.

The trigger word ignoring system 520 may also include a time stamping component 524 configured to generate a time stamp for an identified word in relation to a content playing time of the buffered media stream content and an instructing component 525 including an instruction sending component 526 configured to instruct a VCD to ignore audio content at the time stamped time as the buffered media stream is played.

In this embodiment, the VCD may have conventional functionality with the addition of an instruction receiving component to receive instructions to ignore audio input at time stamped times.

Figure 5B:
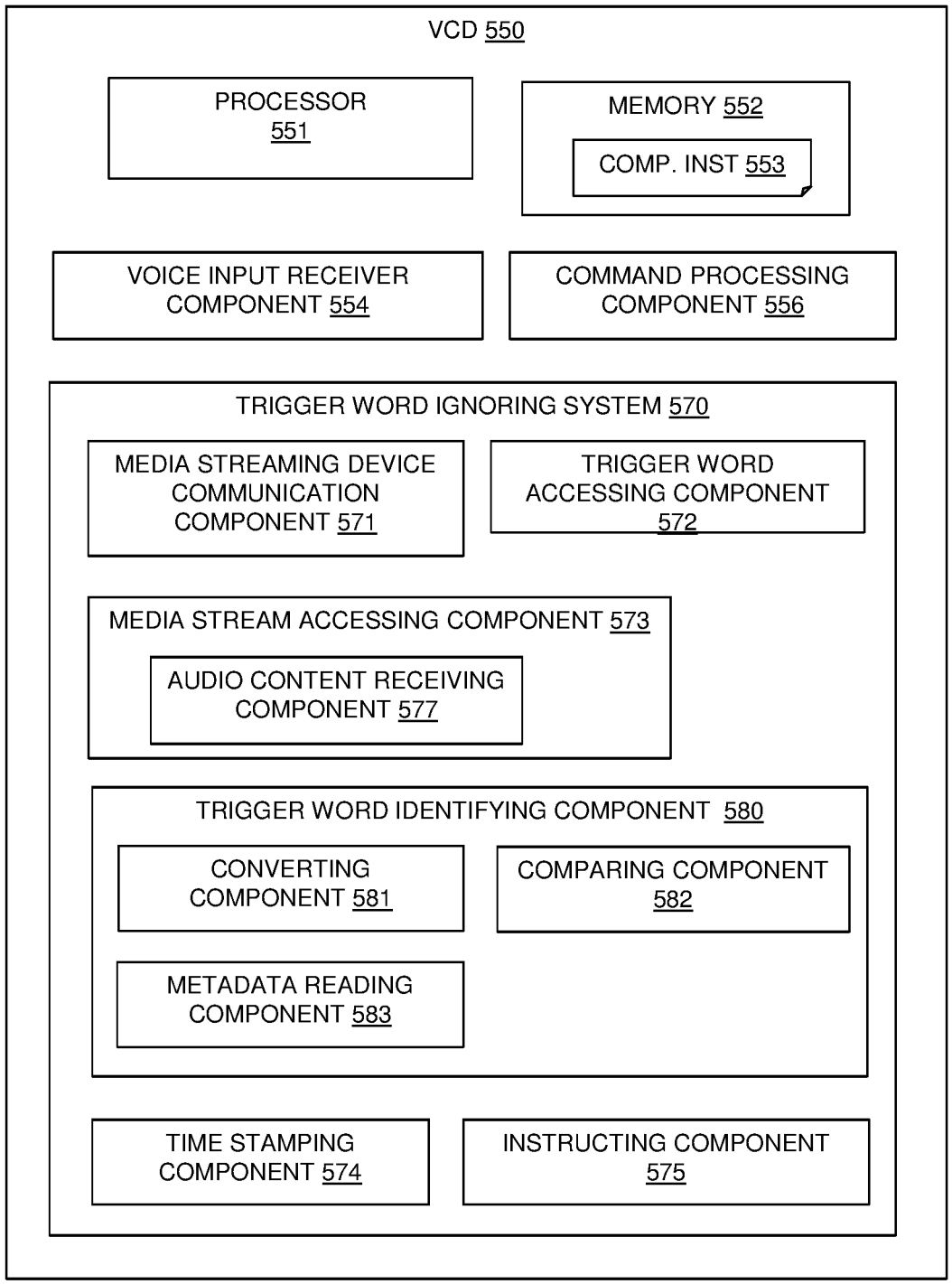
FIG. 5B is a block diagram of a voice command device, in accordance with embodiments of the present disclosure.

FIG. 5B is a block diagram illustrating a voice command device 550, in accordance with embodiments of the present disclosure. The VCD may be the same as, or substantially to, VCD 120 of FIG. 1, the VCD 320 of FIG. 3A, or the VCD 420 of FIG. 3B.

The VCD 550 may be a dedicated device or part of a multi-purpose computing device including at least one processor 551, a hardware module, or a circuit for executing the functions of the described components which may be software units executing on the at least one processor. Multiple processors running parallel processing threads may be provided enabling parallel processing of some or all of the functions of the components. Memory 552 may be configured to provide computer instructions 553 to the at least one processor 551 to carry out the functionality of the components.

The VCD 550 may include components for the known functionality of a VCD that are dependent on the type of device and known voice processing. In one embodiment, the VCD 550 may include a voice input receiver 554 including multiple (two or more) microphones provided in an array to receive voice inputs from different directions relative to the VCD 550. This feature allows the VCD 550 to determine the direction of incoming audio (e.g., via triangulation or TDOA). The VCD 550 may also include a command processing system 556 in the form of existing software of the VCD for receiving and processing voice commands. The VCD software including voice command recognition processing may be provided locally to the VCD 550 or computing device or may be provided as a remote service over a network, for example as a cloud-based service.

In embodiments, the VCD 550 may include a trigger word ignoring system 570 which includes a media streaming device communication component 571 configured to communicate with a media streaming device (e.g., media streaming device 310 of FIG. 3A, 380 of FIG. 3B, or 500 of FIG. 5A) in a near vicinity to the VCD 550, for example via a WiFi or Bluetooth communication.

The trigger word ignoring system 570 at the VCD 550 may include a trigger word accessing component 572 for accessing details of voice command trigger words of the VCD 550. The trigger words can be stored in any suitable memory on the VCD 550. In some embodiments, a table including all trigger words is stored in memory on the VCD 550.

The trigger word ignoring system 570 may also include a media stream accessing component 573 configured to access an audio content of a buffered media stream. The media stream accessing component 573 may include an audio content receiving component 577 configured to receive the audio content from a media streaming device in advance of receiving audio input from playing of the media from the media streaming device.

The trigger word ignoring system 570 may also include a trigger word identifying component 580 configured to identify upcoming voice command trigger words (and/or confusingly similar words to command trigger words) in the received audio content of the buffered media stream.

In embodiments, the trigger word identifying component 580 may include a converting component 581 configured to convert the audio content of the buffered media stream from audio to text; and a comparing component 582 configured to compare the text with text of known trigger words.

Another embodiment of the trigger word identifying component 580 may include a metadata reading component 583 configured to read metadata received with the audio content of the buffered media stream for identifying voice command trigger words in an audio content of the media stream.

The trigger word ignoring system 570 may also include a time stamping component 574 configured to generate a time stamp for an identified word in relation to a content playing time of the buffered media stream content by time stamping the audio content. The trigger word ignoring system 570 may also include an instructing component 575 configured to instruct the command processing component 556 of the VCD 550 to ignore audio content at the time stamped time as the buffered media stream is played by a media streaming device.

In this embodiment, the media streaming device may have conventional functionality with the addition of an audio content sending component for sending the audio content of a buffered media stream to a VCD 550 via a communication channel in advance of playing the media stream.

Figure 6:
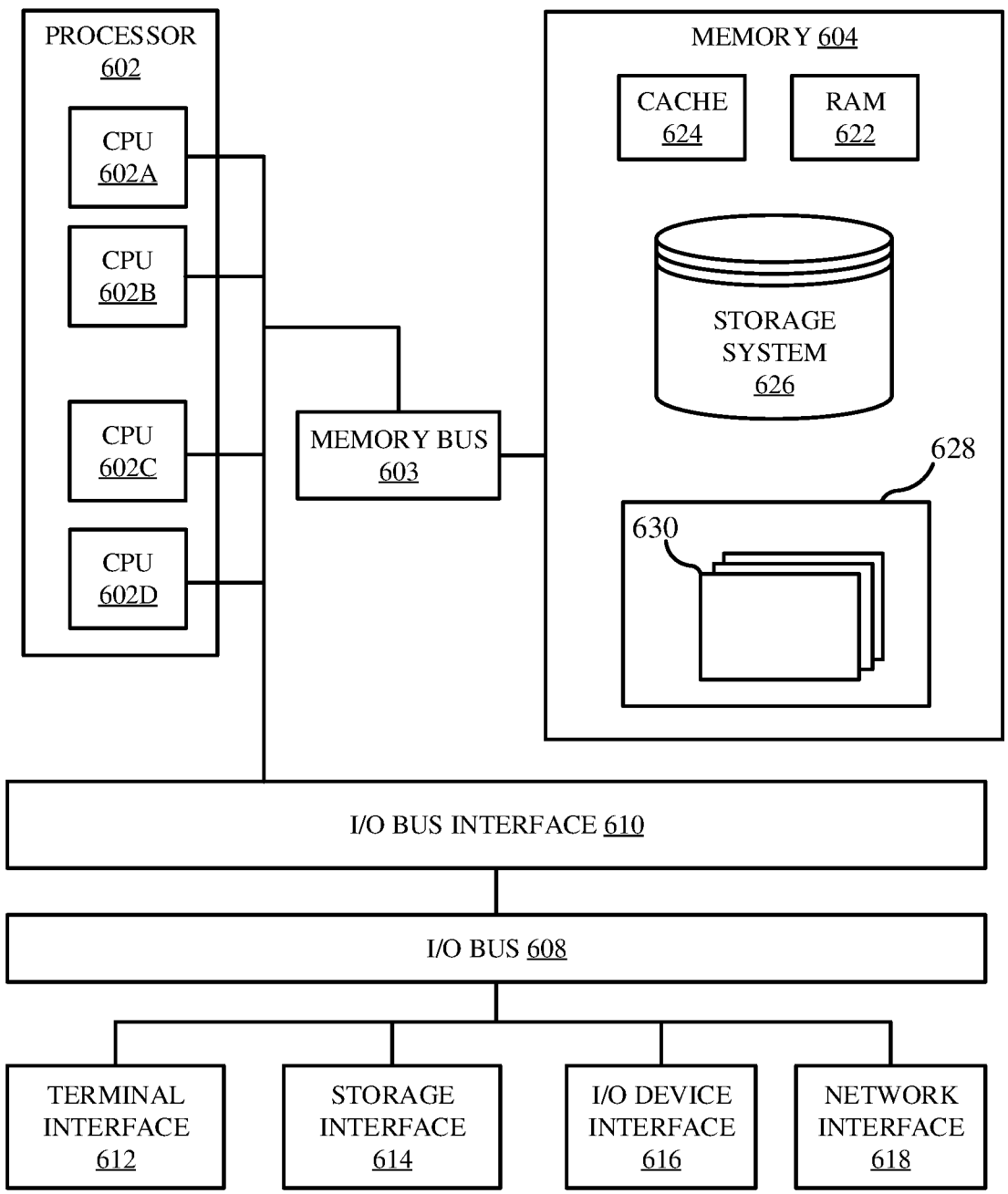
FIG. 6 is a high-level block diagram illustrating an example computer system that can be used in implementing one or more of the methods, tools, and modules, and any related functions, described herein, in accordance with embodiments of the present disclosure.

Referring now to FIG. 6, shown is a high-level block diagram of an example computer system 601 (e.g., VCD 120 of FIG. 1, VCD 320 of FIG. 3A, VCD 420 of FIG. 3B, VCD 550 of FIG. 5B, media streaming device 310 of FIG. 3A, media streaming device 380 of FIG. 3B, media streaming device 500 of FIG. 5A) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

In some embodiments, the program modules 630 of the computer system 601 include a buffered media stream ignoring module. The buffered media stream ignoring module can be configured to access a buffered media stream and identify one or more upcoming trigger words prior to playing the media stream. The buffered media stream ignoring module can further be configured to generate a time stamp for each identified trigger word in the buffered media stream. The buffered media stream ignoring module can further be configured to ignore audio input (e.g., audio content from the buffered media stream, voice commands, etc.) based on the generated time stamp(s).

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
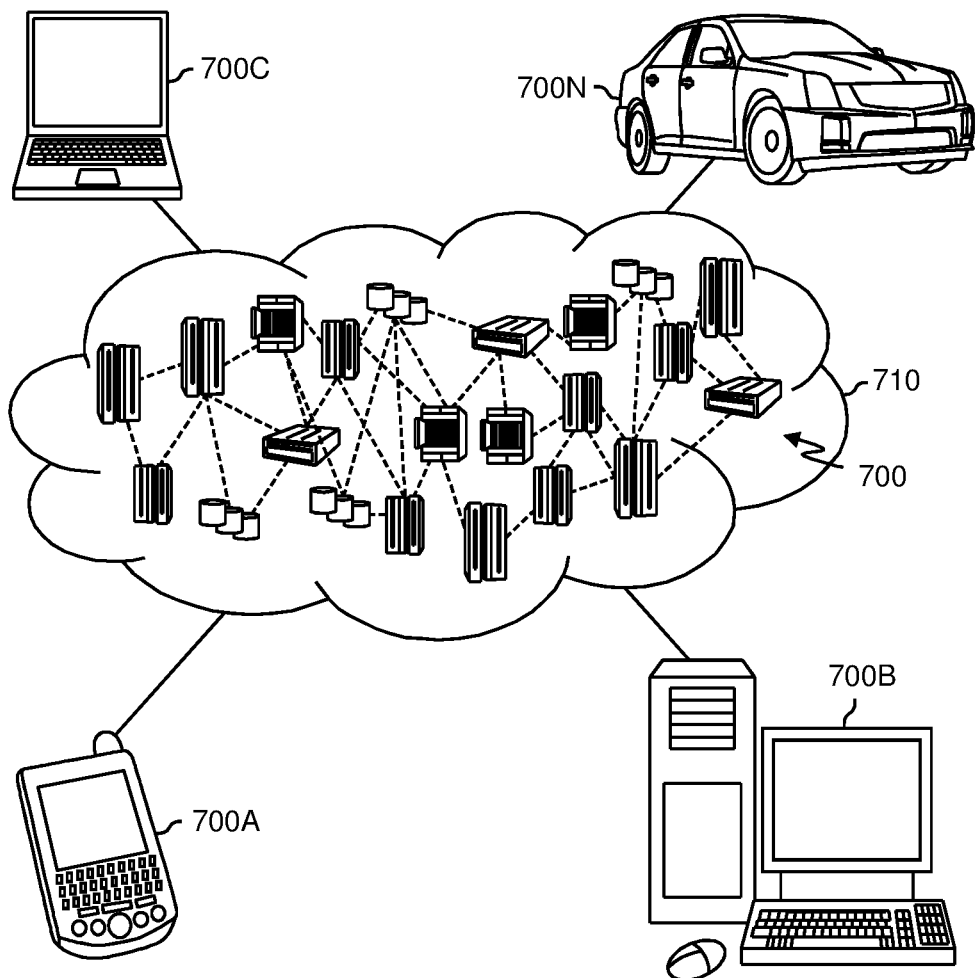
FIG. 7 is a diagram illustrating a cloud computing environment, in accordance with embodiments of the present disclosure.

Referring now to FIG. 7, illustrative cloud computing environment 710 is depicted. As shown, cloud computing environment 710 includes one or more cloud computing nodes 700 with which local computing devices used by cloud consumers, such as, for example, personal digital assistant (PDA) or cellular telephone 700A (e.g., VCD 120, 320, 420, and 500 and media streaming device 310, 380, and 550), desktop computer 700B (e.g., VCD 120, 320, 420, and 500 and media streaming device 310, 380, and 550) laptop computer 700C (e.g., VCD 120, 320, 420, and 500 and media streaming device 310, 380, and 550), and/or automobile computer system 700N can communicate. Nodes 700 can communicate with one another. They can be grouped (not shown) physically or virtually, in one or more networks, such as Private, Community, Public, or Hybrid clouds as described hereinabove, or a combination thereof. This allows cloud computing environment 710 to offer infrastructure, platforms and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

Figure 8:
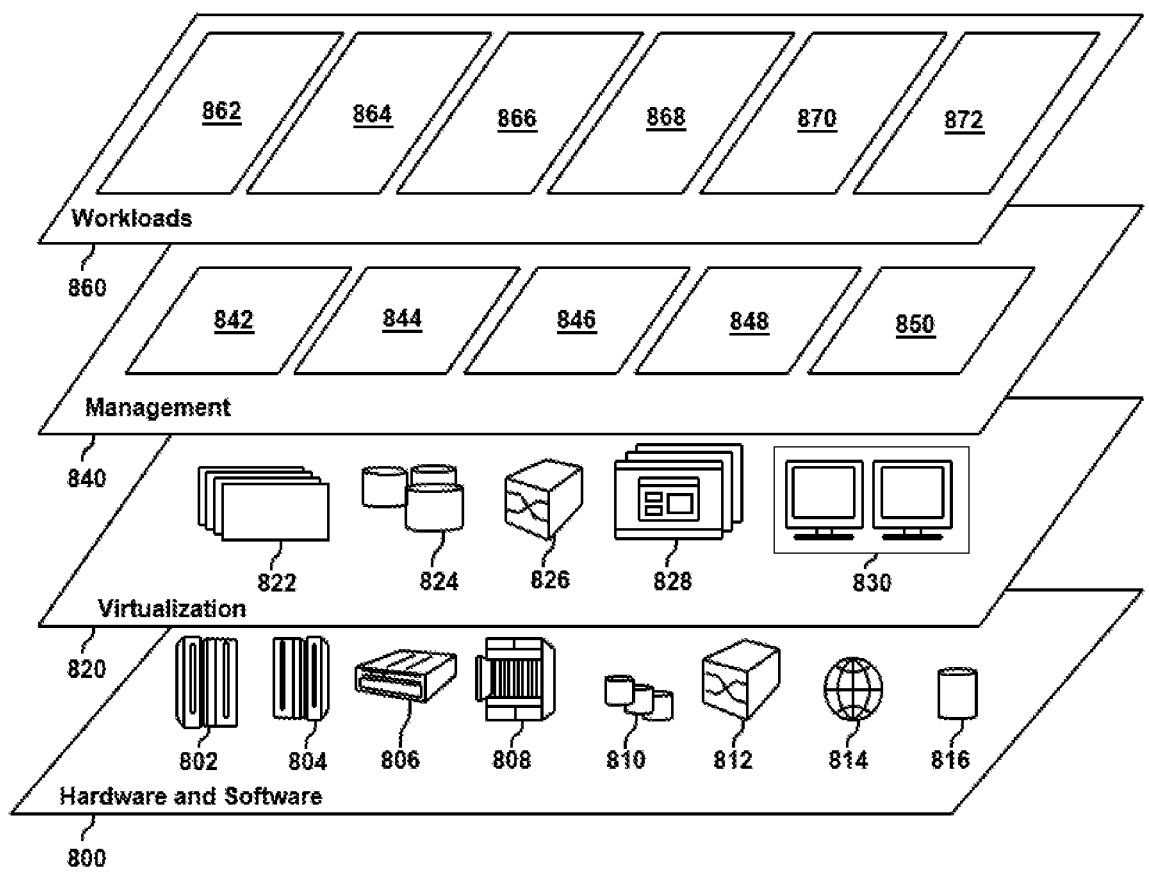
FIG. 8 is a block diagram illustrating abstraction model layers, in accordance with embodiments of the present disclosure.

Referring now to FIG. 8, a set of functional abstraction layers provided by cloud computing environment 710 (FIG. 7) is shown. It should be understood in advance that the components, layers, and functions shown in FIG. 8 are intended to be illustrative only and embodiments of the disclosure are not limited thereto. As depicted below, the following layers and corresponding functions are provided.

Hardware and software layer 800 includes hardware and software components. Examples of hardware components include: mainframes 802; RISC (Reduced Instruction Set Computer) architecture based servers 804; servers 806; blade servers 808; storage devices 810; and networks and networking components 812. In some embodiments, software components include network application server software 814 and database software 816.

Virtualization layer 820 provides an abstraction layer from which the following examples of virtual entities can be provided: virtual servers 822; virtual storage 824; virtual networks 826, including virtual private networks; virtual applications and operating systems 828; and virtual clients 830.

In one example, management layer 840 can provide the functions described below. Resource provisioning 842 provides dynamic procurement of computing resources and other resources that are utilized to perform tasks within the cloud computing environment. For example, resource provisioning 842 can allocate additional computing resources to devices which are indicated to have high activity. Metering and Pricing 844 provide cost tracking as resources are utilized within the cloud computing environment, and billing or invoicing for consumption of these resources. In one example, these resources can include application software licenses. In some embodiments, Metering and Pricing 844 indicates the number of allotted licenses to machines in the system. Security provides identity verification for cloud consumers and tasks, as well as protection for data and other resources. User portal 846 provides access to the cloud computing environment for consumers and system administrators. Service level management 848 provides cloud computing resource allocation and management such that required service levels are met. Service Level Agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment can be utilized. Examples of workloads and functions which can be provided from this layer include: mapping and navigation 862; software development and lifecycle management 864; virtual classroom education delivery 866; data analytics processing 868; transaction processing 870; and identifying an identifiable media 872.

As discussed in more detail herein, it is contemplated that some or all of the operations of some of the embodiments of methods described herein may be performed in alternative orders or may not be performed at all, insofar as they are consistent herein; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for ignoring trigger words in streamed media content, the method comprising:
    accessing a buffered media stream of media content in advance of playing the media stream;
    identifying one or more trigger words in the media content of the buffered media stream;
    generating a time stamp for each of the one or more identified trigger words in relation to a play time of the media content of the buffered media stream; and
    instructing, a predetermined time prior to playing the media content, a voice command device to ignore audio content of the buffered media stream based on the time stamp for each of the one or more identified trigger words while the buffered media stream is played.

2. The method of claim 1, wherein a duration of each of the one or more trigger words in the stream is determined; and
    wherein the audio content is ignored based on the duration of each of the one or more trigger words.

3. The method of claim 1, wherein identifying the one or more trigger words includes:
    converting audio content of the buffered media stream from audio to text; and
    comparing the text of the buffered media stream with text of known trigger words.

4. The method of claim 1, wherein identifying the one or more trigger words includes:
    receiving the buffered media stream with metadata identifying voice command trigger words in an audio content of the media stream.

5. The method of claim 1, wherein the method is executed by a media streaming device and further includes:
    receiving and buffering a media stream prior to outputting the media stream; and
    accessing details of voice command trigger words from the voice command device, wherein the media streaming device instructs the voice command device to ignore audio content of the buffered media stream based on the time stamp for each of the one or more identified trigger words while the buffered media stream is played.

6. The method of claim 5, wherein the instructing is completed in real time while the media content is playing.

7. The method of claim 1, wherein the method is executed by the voice command device.

8. The method of claim 7, wherein instructing the voice command device to ignore audio content of the buffered media stream further comprises:
    determining, via time difference of arrival using two or more microphones mounted in the voice command device, a direction the audio content of the buffered media stream is being received from;
    storing the direction as a direction of a media streaming device; and
    ignoring audio content of the buffered media stream from the direction of the media streaming device based on the time stamp for each of the one or more identified trigger words while the buffered media stream is played.

9. The method of claim 7, wherein instructing the voice command device to ignore audio content of the buffered media stream comprises ignoring all received audio input.

10. A system for ignoring trigger words in streamed media content, comprising:
    a processor and a memory configured to provide computer program instructions to the processor to execute the function of the components;
    a media stream accessing component configured to access a buffered media stream of media content in advance of playing the media stream;
    a trigger word identifying component configured to identify one or more trigger words in the buffered media stream;
    a time stamping component configured to generate a time stamp for each of the one or more identified trigger words in relation to a play time of the media content of the buffered media stream; and
    an instructing component configured to instruct, a predetermined time prior to playing the media content, a voice command device to ignore audio content of the buffered media stream based on the time stamp for each of the one or more identified trigger words while the buffered media stream is played.

11. The system of claim 10, wherein the time stamping component is configured to determine a duration of each trigger word in the stream; and
    wherein the instructing component is configured to instruct the voice command device to ignore audio content at the time stamped time for the duration of each trigger word.

12. The system of claim 10, wherein the trigger word identifying component includes:
    a converting component configured to convert an audio content of the buffered media stream from audio to text; and
    a comparing component configured to compare the text of the buffered media stream with text of known trigger words.

13. The system of claim 10, wherein the trigger word identifying component includes:
    a metadata reading component configured to read metadata received with the buffered media stream for identifying voice command trigger words in an audio content of the media stream.

14. The system of claim 10, wherein the system is a trigger word ignoring system at a media streaming device and further includes:

a media stream buffering component configured to receive and buffer a media stream prior to playing as media output;

a trigger word accessing component configured to access details of voice command trigger words from the voice command device; and wherein the instructing component includes an instruction sending component configured to send instructions to the voice command device.

15. The system of claim 10, wherein the system is a trigger word ignoring system at the voice command device and wherein:

the media stream accessing component receives an audio content of a media stream prior to the playing of the media stream from a media streaming device;

the trigger word identifying component identifies the trigger words in the audio content of the buffered media content by comparing the trigger words in the audio content to a table trigger words stored in the voice command device;

the instructing component ignores each trigger word as the audio of the streamed media stream is received.

16. The system of claim 15, wherein the instructing component instructs the voice command device to ignore audio input from all directions.

17. The system of claim 15, wherein the instructing component instructs the voice command device to ignore audio content by:

determining, via time difference of arrival using two or more microphones mounted in the voice command device, a direction the audio content of the buffered media stream is being received from;

storing the direction as a direction of a media streaming device; and ignoring audio content of the buffered media stream from the direction of the media streaming device based on the time stamp for each of the one or more identified trigger words while the buffered media stream is played.

18. A computer program product for ignoring trigger words in streamed media content, the computer program product comprising a computer readable storage medium having program instructions embodied therewith, the program instructions executable by a processor to cause the processor to perform a method comprising:

accessing a buffered media stream of media content in advance of playing the media stream;

identifying one or more trigger words in the media content of the buffered media stream by converting audio content of the buffered media stream to text and comparing the text of the buffered media stream to a table of known trigger words stored in a voice command device using natural language processing;

generating a time stamp for each of the one or more identified trigger words in relation to a play time of the media content of the buffered media stream; and instructing the voice command device to ignore, a predetermined time prior to playing the media content, audio content of the buffered media stream based on the time stamp for each of the one or more identified trigger words while the buffered media stream is played.

19. The method of claim 1, wherein prior to instructing the voice command device to ignore audio content of the buffered media stream, the method further comprises:

receiving a command from a user to pause the media content;

pausing the media content, wherein the generated time stamps for each of the one or more identified trigger words remain valid with respect to the play time of the media content of the buffered media stream during the pause; and wherein the voice command device is instructed to, a predetermined time prior to playing the media content, ignore audio content of the buffered media stream based on the time stamps for each of the one or more identified trigger words while the buffered media stream is played.

* * * * *